US012673818B2

(12) United States Patent　(10) Patent No.:　US 12,673,818 B2
Santicchi　(45) Date of Patent:　Jul. 7, 2026

(54) AUTOMATED WAREHOUSE

(71) Applicant: IMMOBILIARE METALPROGETTI S.R.L., Perugia (IT)

(72) Inventor: Enrico Maria Santicchi, Perugia (IT)

(73) Assignee: IMMOBILIARE METALPROGETTI S.R.L. (IT)

( * ) Notice: Subject to any disclaimer, the term of this patent is extended or adjusted under 35 U.S.C. 154(b) by 854 days.

(21) Appl. No.: 17/999,452

(22) PCT Filed: May 20, 2021

(86) PCT No.: PCT/IT2021/050155
§ 371 (c)(1),
(2) Date: Nov. 21, 2022

(87) PCT Pub. No.: WO2021/234755
PCT Pub. Date: Nov. 25, 2021

(65) Prior Publication Data
US 2023/0219752 A1　Jul. 13, 2023

(30) Foreign Application Priority Data

May 21, 2020　(IT) ........................ 102020000011974

(51) Int. Cl.
B65G 1/04　(2006.01)
B65G 1/06　(2006.01)
(52) U.S. Cl.
CPC ......... B65G 1/0478 (2013.01); B65G 1/0485 (2013.01); B65G 1/06 (2013.01); B65G 2201/0235 (2013.01)

(58) Field of Classification Search
None
See application file for complete search history.

(56) References Cited

U.S. PATENT DOCUMENTS

| | | | | |
|---|---|---|---|---|
| 5,364,220 A * | 11/1994 | Killinger | .................. | B65G 1/06 |
| | | | | 414/278 |
| 5,409,342 A * | 4/1995 | Galli | .................... | B65G 1/1371 |
| | | | | 414/21 |
| 8,276,739 B2 * | 10/2012 | Bastian | ................ | B65G 1/1375 |
| | | | | 414/277 |
| 8,397,644 B2 * | 3/2013 | Aschauer | .................. | B66F 9/08 |
| | | | | 104/118 |
| 8,397,897 B2 * | 3/2013 | Bastian, II | ............. | B65G 47/82 |
| | | | | 414/277 |

(Continued)

FOREIGN PATENT DOCUMENTS

| | | |
|---|---|---|
| CN | 106 516 535 A | 3/2017 |
| DE | 32 21 343 A1 | 12/1983 |

(Continued)

OTHER PUBLICATIONS

International Search Report for PCT/IT2021/050155.

*Primary Examiner* — Mark C Hageman
(74) *Attorney, Agent, or Firm* — BakerHostetler

(57)　ABSTRACT

Automated warehouse for storing articles, equipped with an apparatus (20) for loading and unloading the articles. The loading and unloading apparatus (20) comprises at least one mobile transport device (22) able to be displaced between a station (23) for feeding and withdrawing articles, and a loading and unloading sector (200) of the loading and unloading apparatus (20).

20 Claims, 3 Drawing Sheets

(56) References Cited

U.S. PATENT DOCUMENTS

| | | | | |
|---|---|---|---|---|
| 9,254,958 | B2 * | 2/2016 | De Vries | B65G 1/0407 |
| 9,340,355 | B2 * | 5/2016 | De Vries | B65G 1/0478 |
| 10,322,875 | B2 * | 6/2019 | De Vries | B65G 1/0435 |
| 10,894,663 | B2 * | 1/2021 | Kapust | B65G 1/1373 |
| 10,934,090 | B2 * | 3/2021 | Leow | B65G 1/133 |
| 11,130,633 | B2 * | 9/2021 | Kakinuki | B65G 1/0485 |
| 12,208,962 | B2 * | 1/2025 | Yanagisawa | B65G 47/82 |
| 12,319,503 | B2 * | 6/2025 | Nguyen | G07F 11/54 |
| 2016/0060037 | A1 * | 3/2016 | Razumov | B65G 1/065 |
| | | | | 700/216 |

FOREIGN PATENT DOCUMENTS

| | | | |
|---|---|---|---|
| EP | 3 112 295 | A1 | 1/2017 |
| EP | 3 519 328 | A1 | 8/2019 |
| NL | 2 015 045 | B1 | 1/2017 |
| WO | 199935061 | A1 | 7/1999 |

* cited by examiner

AUTOMATED WAREHOUSE

FIELD OF THE INVENTION

The present invention concerns an automated warehouse suitable to contain a plurality of articles, even very different from each other, possibly enclosed inside box-like packages. In particular, the invention concerns a multi-floor warehouse with independent rotating carousels equipped with an apparatus to automatically load and unload said articles. This type of multi-floor warehouse is suitable for storing articles for large-scale distribution, in particular for the physical management of orders collected on online commerce sites, or for the management of orders in large-scale distribution that provides home deliveries of goods ordered remotely.

BACKGROUND OF THE INVENTION

Warehouses for storing articles before they are sold have been known for some time, particularly in large-scale distribution. With the advent, over the last few years, of online large-scale distribution, the number of sales, and consequently also the flow of articles, is continuously increasing. The warehouses are therefore getting larger and larger and contain a number of articles to be managed that is growing continuously.

To manage the ever-increasing number of orders in the best possible way, it is necessary to automate the movement of articles, in order to limit the movement of human operators between the warehouse shelves as much as possible, and thus reduce process times and the risk of errors.

Examples of automated warehouses are described in patent documents CN 106516535 A, DE 102015114410 A1, WO 99/35061 A1 and DE 8706291 U1.

One known solution of an automated warehouse provides the presence of a plurality of fixed rectilinear shelves, on several planes, disposed parallel to each other so as to define a plurality of longitudinal corridors, and the presence of a plurality of automatic conveyors, also called "shuttles" or AGV shuttles (acronym of the English "Automated Guided Vehicle"), which move autonomously along the longitudinal corridors, as for example provided in the solutions described in the above documents DE 102015114410 A1 and DE 8706291 U1. According to a possible embodiment, a "shuttle" is provided for each floor of the warehouse, and for each longitudinal corridor.

At one end of the shelves there are stations for loading/unloading the articles, provided with conveyors on each floor and with elevators to bring the articles to a predefined floor, as for example provided in the solution described by CN 106516535 A. The articles are fed toward the loading/unloading stations by means of a conveyor belt fed by a human operator.

This solution does not satisfy all the needs felt in the sector, in particular with regard to the speed of processing the orders.

In fact, due to the sizes, in particular the lengths, of the shelves, the shuttles have to travel such distances that it is necessary to provide that they are each equipped with their own motor, generally an electric motor. The presence of the motors poses problems of autonomy of the shuttles, because the electric motor has to be recharged regularly. While the motor is being recharged, a shuttle necessarily has to remain stationary in correspondence with a recharging station, which determines either the impossibility of accessing the warehouse zone served by that particular shuttle, or the need to replace the shuttle being recharged with another shuttle.

The need to equip the shuttles with their own motors also poses problems related to the maintenance of the motors, which often entails long and irksome operations, and which negatively impact the speed and efficiency of the warehouse.

Another problem with this type of system lies in the need to design a plant to transport the articles over a large operating surface, to allow the shuttles access to the entire warehouse. This entails the need to design an articulated and complicated structure of the transport plant, which will therefore be difficult to assemble.

Another problem with this type of system is that it requires a large number of shuttles, proportional to the size and layout of the warehouse, and which significantly increases the costs of the system since each shuttle is very expensive.

Even the automated warehouses of the type known in the state of the art without shuttles, such as for example those described by CN 106516535 A, have some problems due to the poor flexibility of the plant. In fact, the structure of the warehouse described in this document has a limited productivity, understood as the number of articles moved in the unit of time. This is due to the fact that the central structure, which carries the loading/unloading device to load or pick up the articles, is a single one only for all the shelves and for all the floors. Consequently, it is not possible to load or unload articles at the same time from different shelves, nor from different floors of the same shelf.

There is therefore a need to perfect an automated warehouse that can overcome at least one of the disadvantages of the state of the art.

In particular, one purpose of the present invention is to provide an automated warehouse which optimizes the speed of processing the orders, and is able to considerably increase the number of orders, and of articles, managed and processed in the unit of time.

Another purpose of the present invention is to provide an automated warehouse which is not subject to stoppages for the maintenance of its components.

Yet another purpose of the invention is to provide an automated warehouse which has a simple and compact structure, the functioning of which is effective and reliable.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, hereafter there is described an automated warehouse which overcomes the limits of the state of the art and eliminates the defects present therein.

In accordance with some embodiments, the automated warehouse comprises an apparatus for loading and unloading articles, which comprises at least one mobile transport device, a fixed support structure in which the mobile transport device is mobile, and at least one sector for loading and unloading articles. Preferably, the support structure extends along a directrix of development, and is advantageously provided with at least two internal longitudinal floors, at two different heights, each of the floors comprising at least one respective mobile transport device. The latter is mobile along the directrix of development defined by the support structure. The directrix of development develops in order to reach the loading and unloading sector.

According to some embodiments, the apparatus also comprises at least one feeding and withdrawing station, preferably located in correspondence with one end of the support structure. Advantageously, the feeding and withdrawing station comprises at least one feed device, preferably fixed, for example of the roller conveyor type.

Advantageously, the apparatus for loading and unloading articles comprises at least one elevating device disposed between the feed device and the support structure so as to lift an article from the feed device and make it accessible to a mobile transport device disposed on a floor of the support structure, which is placed at a different height, with reference to the ground floor, with respect to the height of the feed device.

According to some embodiments, each mobile transport device is displaceable in a direction of displacement and comprises a gripping member which can be extended in a gripping direction that is inclined, preferably perpendicular, to the direction of displacement. Both the displacement and gripping directions are advantageously comprised in a horizontal plane. Advantageously, the direction of displacement is longitudinal to the support structure, that is, it is the same direction in which the support structure extends in its directrix of development.

Advantageously, the mobile transport device comprises a first motor member connected to the extendable gripping member and able to drive its extension.

More preferably, the extendable gripping member comprises a pair of telescopic arms.

According to some embodiments, the transport device also comprises a lifting member on which the gripping member is mounted.

Advantageously, the transport device comprises a second motor member connected to the lifting member and able to drive it.

According to some embodiments, the automated warehouse also comprises at least one storage and conveyor unit comprising at least one conveyor, and a plurality of containers able to contain articles and connected to the conveyor so that the latter displaces the containers along a predefined path. Preferably, the predefined path provides a station for loading and unloading the articles. The conveyor is oriented horizontally.

Advantageously, the containers are removably connected to the conveyor.

The apparatus for loading and unloading articles preferably provides a loading and unloading sector placed facing at least in the proximity of the station for loading and unloading articles, so that a mobile transport device, when disposed in correspondence with the loading and unloading sector as above, is able to pick up, or release, at least one container by means of the extendable gripping member.

Advantageously, the plurality of containers of one conveyor is distributed on two or three parallel planes.

Preferably, the automated warehouse comprises a centralized movement device equipped with drive belts able to drive the displacement of the mobile transport devices.

According to one aspect of the invention, a method for loading or unloading one or more articles from an automated warehouse is also described, in which there is provided an automated warehouse as indicated above.

In particular, the method provides a step of displacing the mobile transport device, along a displacement path that includes the loading and unloading sector, from or toward the latter, and simultaneously, after or before the step as above, a step of displacing, by means of a conveyor module, at least one article toward or away from the loading and unloading station, where the mobile transport device is located, so that the articles face the loading and unloading sector.

According to some embodiments, in the event that an article has to be introduced into the warehouse, the article is transferred from the loading and unloading sector of the loading and unloading apparatus to the loading and unloading station of the conveyor module, by means of the mobile transport device, located in correspondence with the loading and unloading sector. Conversely, if an article has to be picked up from the warehouse, it is transferred, by means of the mobile transport device, from the loading and unloading station of the conveyor module to the loading and unloading sector of the loading and unloading apparatus.

BRIEF DESCRIPTION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the possible embodiments of the invention, of which one or more examples are shown in the attached drawings. Each example is supplied by way of illustration of the invention and shall not be understood as a limitation thereof. For example, one or more characteristics shown or described insomuch as they are part of one embodiment can be varied or adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
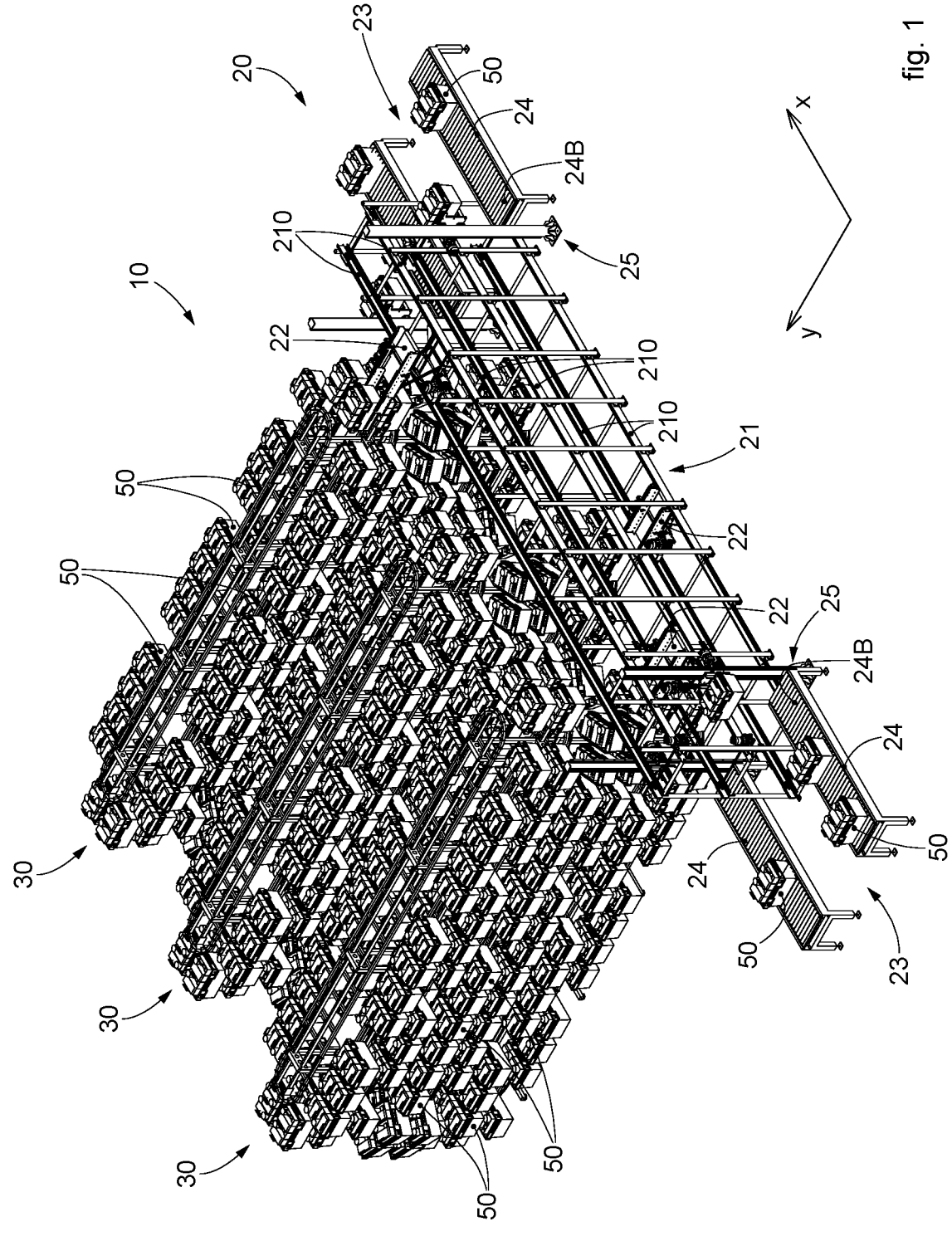
FIG. 1 is a schematic perspective view of a warehouse comprising an automated apparatus for loading and unloading articles according to the invention.
Figure 2:
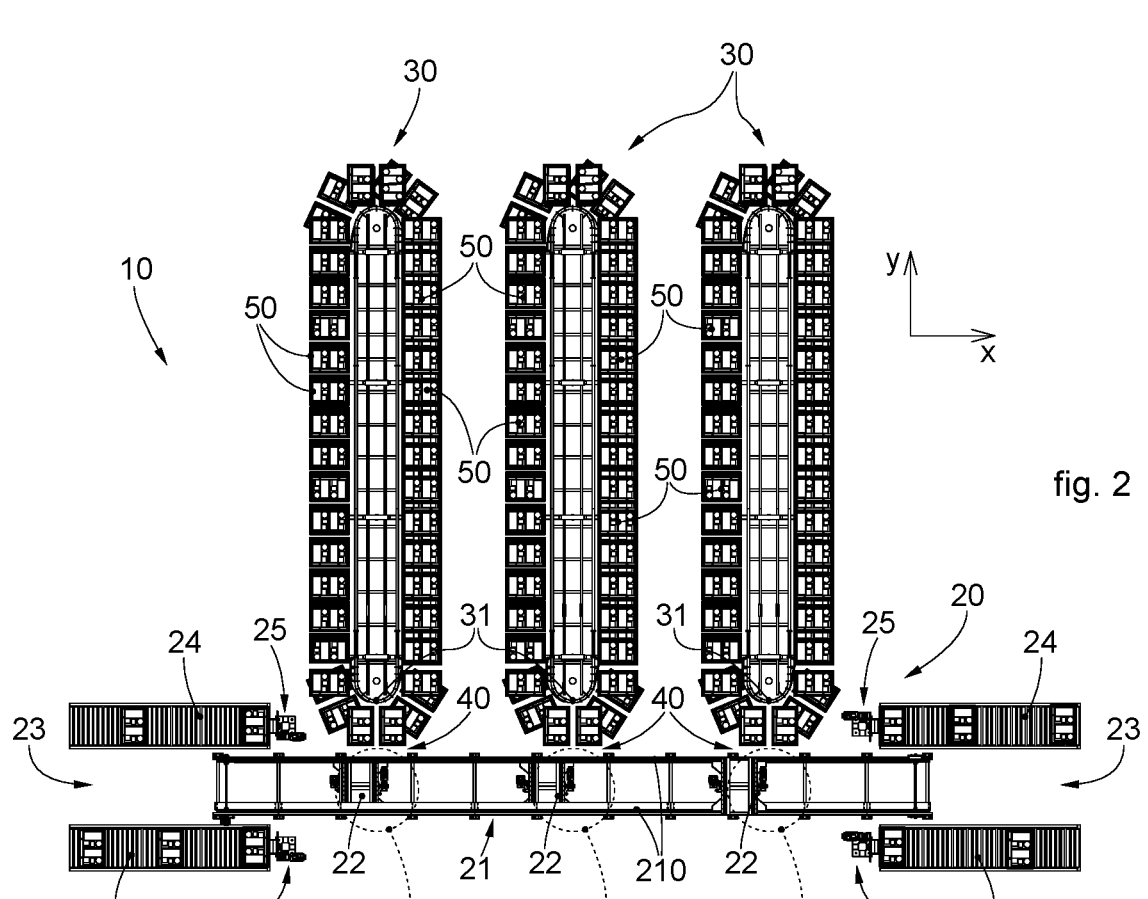
FIG. 2 is a schematic top plan view of the automated warehouse of FIG. 1.

FIGS. 1 and 2 show one example of an automated warehouse indicated as a whole with reference number 10. The warehouse 10 comprises an apparatus 20 for loading and unloading articles and at least one storage and conveyor unit 30, in which some containers 50 are disposed able to contain articles.

In the example shown, the apparatus 20 for loading and unloading articles has a rectilinear extension in a first direction X, and the storage and conveyor unit 30 also has a rectilinear extension oriented in a second direction Y, perpendicular to the first direction X. It should be noted, however, that in other embodiments, not shown, the directions X and Y can be inclined with respect to each other without being perpendicular, that is, they can define between them an angle different from 90°.

Figure 3:
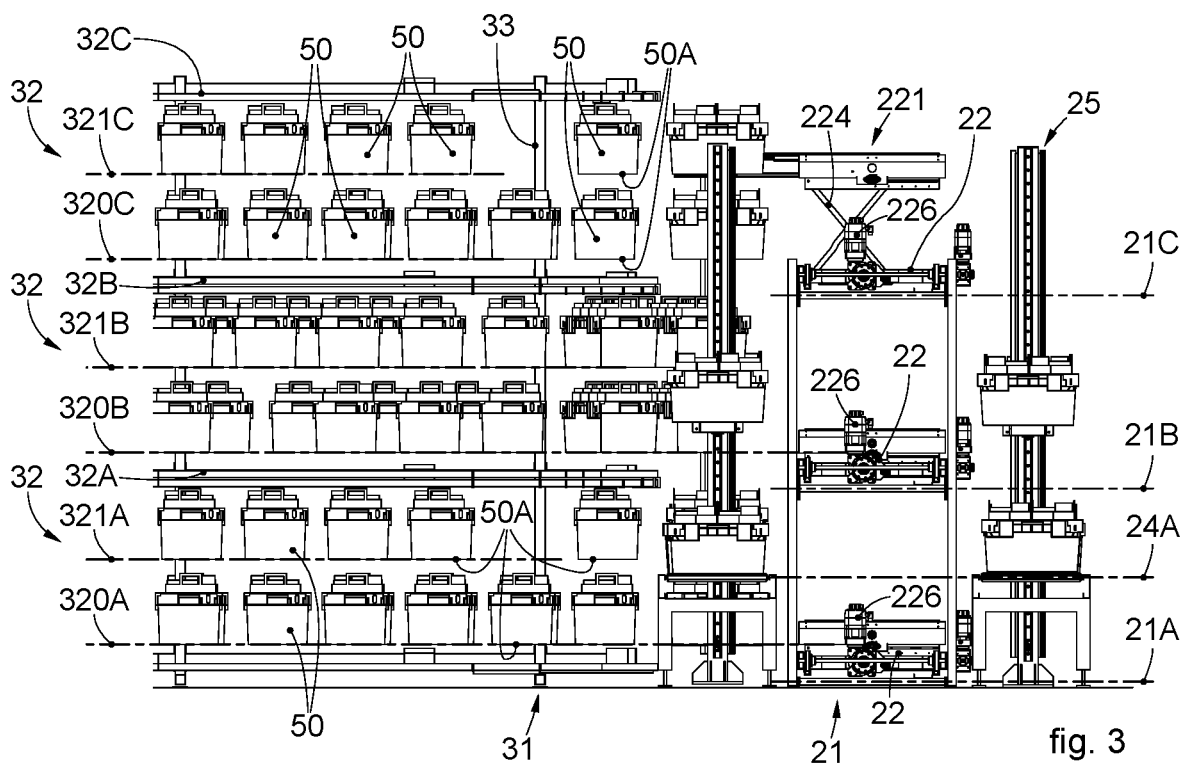
FIG. 3 is a schematic lateral view of a part of the automated warehouse of FIG. 1 containing the apparatus for loading and unloading articles.

The apparatus 20 for loading and unloading articles comprises a support structure 21 which essentially defines the extension of the apparatus 20. In particular, the support structure 21 extends in a direction of extension which, in the example shown, corresponds to the first direction X. The support structure 21 shown comprises three transport planes 21A, 21B, 21C, parallel to each other, which extend horizontally in the direction of extension (FIG. 3). Each transport plane 21A, 21B, 21C comprises a pair of counter-facing guides 210.

The apparatus 20 also comprises a plurality of mobile transport devices 22, specifically three mobile transport devices 22, installed on the support structure 21 so as to be displaced in the direction of extension. Each mobile transport device 22 is installed on a respective transport plane 21A, 21B, 21C so that it can be displaced independently of the others and without interfering with them along the guides 210.

In general, the apparatus 20 provides a number of mobile transport devices 22 equal to the number of transport planes 21A, 21B, 21C provided, so that each transport plane 21A, 21B, 21C is served by a corresponding mobile transport device 22. This allows to load/unload articles simultaneously on/from different transport planes, and possibly also on/from different storage and conveyor units.

The support structure 21 shown here is rectilinear, but it is possible to provide that it has a different shape, for example curved, provided that it allows the displacement of the mobile transport device 22 in the direction of extension, or more generally along a directrix of development. In this case, the pair of guides 210 has a shape coherent with the conformation of the support structure 21.

According to some embodiments, the apparatus 20 for loading and unloading articles also comprises a feeding and withdrawing station 23, preferably two, as shown in FIGS. 1 and 2, each disposed at a respective end of the support structure 21. The feeding and withdrawing station 23 comprises a pair of preferably fixed feed devices 24, for example roller conveyors, on which the articles entering and/or exiting the apparatus 20 are fed. The feed devices 24 define a feed plane 24A on which the articles transit (FIG. 3).

In correspondence with the feeding and withdrawing stations 23, there can be provided the presence of a human operator who disposes the articles on the feed plane 24A, or withdraws them from it. In other embodiments, the feed stations 23 can be managed automatically by robotic operators, for example configured as suitable articulated arms dedicated to the purpose.

Advantageously, the feed devices 24 are disposed in such a way as to have at least one end portion 24B facing a portion, for example an end portion, of the support structure 21, so that the mobile transport devices 22 can pick up and put back the articles from and on the feed device 24.

Preferably, the apparatus 20 for loading and unloading articles also comprises at least one elevating device 25, preferably a plurality, disposed in correspondence with the end portion 24B of the feed device 24. The elevating device 25, of a known type, is able to pick up the articles from the feed device 24, and to take them to a different height with respect to the feed plane 24A, for example at the height of one of the transport planes 21A, 21B, 21C of the support structure 21.

Preferably, the elevating device 25 is disposed so as to displace the articles along a vertical plane facing and in the proximity of the support structure 21, so that the articles are accessible to the mobile transport devices 22.

Figures 4, 5:
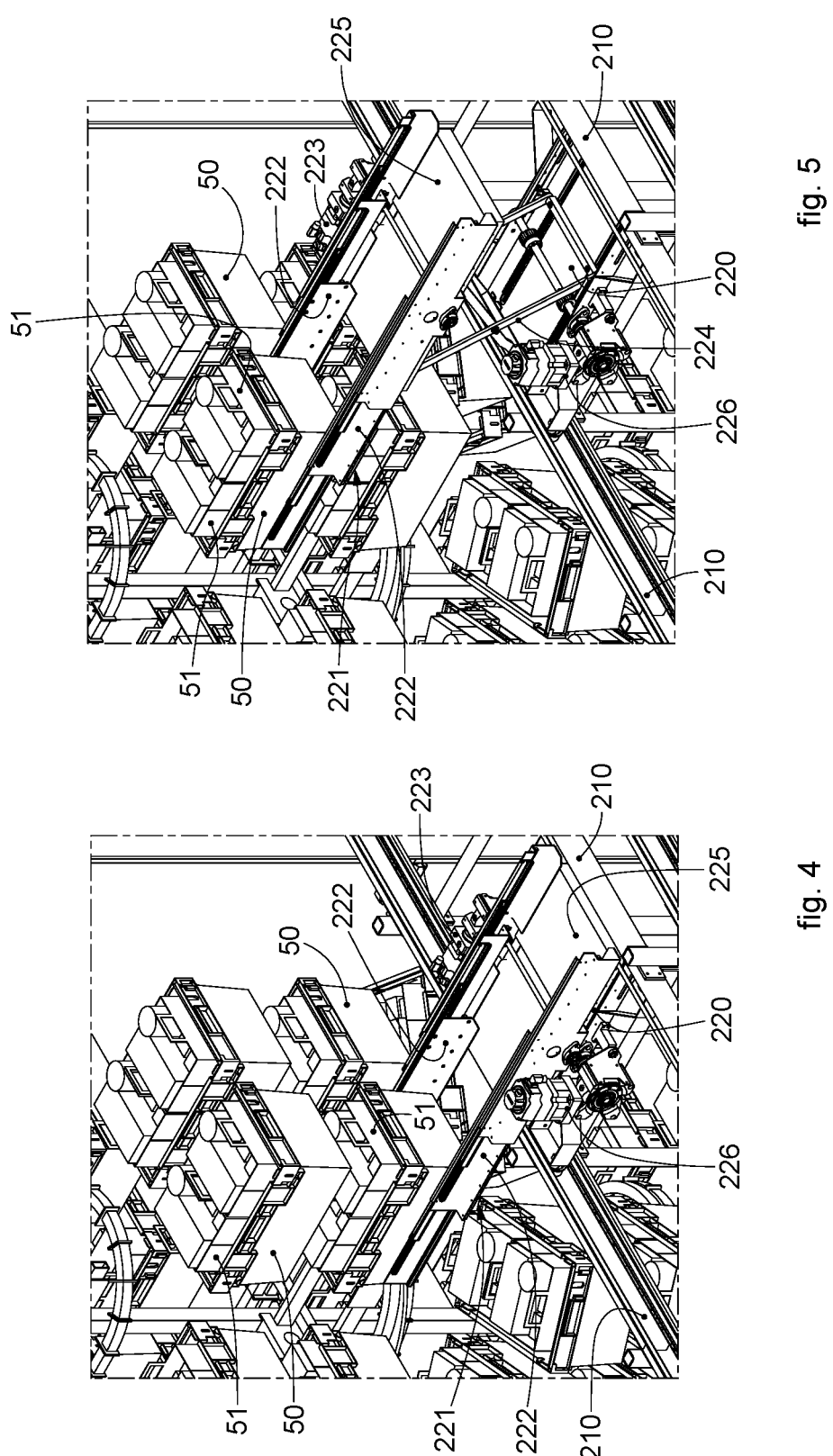
FIGS. 4 and 5 are perspective views of a detail of the automated warehouse, in two different operating positions.

FIGS. 4 and 5 show, in particular, a mobile transport device 22 in accordance with one embodiment of the automated warehouse 10 described here.

The mobile transport device 22 comprises a slider 220 mounted sliding on a pair of guides 210 previously mentioned, and a gripping member 221 installed on the slider 220. The gripping member 221 is suitably extendable in a gripping direction that is horizontal and inclined with respect to the direction of displacement of the slider 221, which—in the example shown—corresponds to the first direction X. Always in the example shown, the gripping direction is perpendicular to the direction of displacement of the slider 220, and therefore corresponds to the second direction Y.

According to some embodiments, the gripping member 221 comprises a pair of reciprocally distanced telescopic arms 222, able to take a container 50 (FIGS. 4 and 5). For this purpose, the telescopic arms 222 comprise, at least in the end portion that grips the container 50, L-shaped elements, distanced at a distance substantially equal to the width of the containers 50. Obviously, in other entirely equivalent embodiments, other types of extendable gripping members can be provided according to requirements, for example whether the aim is to grip the containers 50 or the articles individually. The gripping device 221 is driven in elongation by a first motor member 223 connected to it.

In accordance with some embodiments, the mobile transport device 22 also comprises a lifting member 224 on which the gripping member 221 is mounted, and which is able to lift it. The mobile transport device can therefore assume a lowered position, shown in FIG. 4, and a raised position, shown in FIG. 5. The usefulness of this latter position will be explained in more detail below.

Advantageously, the lifting member 224 is mounted directly on the slider 220, and comprises for example a pantograph mechanism. For a better support of the containers 50 when they are disposed in the mobile transport device 22, it is preferable to provide that the telescopic arms 222 are mounted on a support plate 225, which in turn is mounted on the lifting member 224.

Preferably, the mobile transport device 22 also comprises a second motor member 226 connected to the lifting member 224 and able to drive it in order to change the height of the gripping member 221 with respect to the slider 220.

It should be noted that the mobile transport devices 22 are displaced in the direction X by a centralized movement device, that is, of the loading and unloading apparatus 20 itself, for example of the belt type.

In this way, the apparatus 20 advantageously allows to have mobile transport devices 22 that do not have an individual motor for their displacement.

As previously stated, the automated warehouse 10 also comprises at least one storage and conveyor unit 30. In the example shown, three storage and conveyor units 30 are provided. They are elongated in shape, and extend—as a prevailing direction of development, parallel to the second direction Y, disposed parallel to each other and aligned one after the other in succession in the first direction X. The storage and conveyor units 30 each define, at their end 31, a loading and unloading station 40 (see FIG. 2) in correspondence with which the articles are loaded onto, or unloaded from, the storage and conveyor units 30 by means of the mobile transport devices 22.

As can be seen in FIG. 2, the apparatus 20 for loading and unloading articles comprises for example three loading and unloading sectors 200 that correspond to sections of the support structure 21 placed in correspondence with the loading and unloading stations 40. Obviously, the number of such sectors 200 can vary according to the number of storage and conveyor units 30, and/or according to the number of loading and unloading stations 40.

Each storage and conveyor unit 30 comprises a plurality of conveyors 32, in particular three conveyors 32A, 32B, 32C disposed one above the other (FIG. 3), preferably all horizontal, that is, each one mobile along a respective horizontal reference plane. They are advantageously of the closed-circuit type, and preferably mounted on at least one bearing structure 33.

Each conveyor 32A, 32B, 32C displaces a plurality of containers 50 disposed aligned on a first conveying plane 320A, 320B, 320C, advantageously horizontal. Preferably each conveyor 32A, 32B, 32C displaces the containers 50 also on a second conveying plane 321A, 321B, 321C, disposed parallel to and above the first conveying plane 320A, 320B, 320C, as shown in FIGS. 1-3.

More precisely, the containers 50 have bottoms 50A respectively aligned on the first or second conveying planes 320A, 321A, 320B, 321B, 320C, 321C (FIG. 3).

Preferably, each of the first conveying planes 320A, 320B, 320C is disposed at a height, with respect to the ground, slightly greater than the height of a corresponding transport plane 21A, 21B, 21C of the support structure 21. More precisely, the first conveying planes 320A, 320B, 320C are disposed at a height corresponding to the height of the gripping member 221 of a corresponding mobile transport device 22 when this is in the lowered position (see transport planes 21A and 21B and conveying planes 320A and 320B of FIG. 3). In this way, it is possible to take a container 50 by means of a mobile transport device 22 without having to drive the lifting member 224.

It can be inferred that the second conveying planes 321A and 321B of the first and second conveyor 32A, 32B are disposed at a height greater than the first conveying plane 320A, 320B of the respective conveyor 32A, 32B, but also lower than the height of the second and third transport planes 21B, 21C, respectively.

According to some embodiments, the containers 50 are configured as crates, or cases, or box-shaped boxes, preferentially rigid, and able to contain a plurality of articles which can also be different from each other. It is possible to provide that the articles are also disposed in secondary containers 51 which, in turn, are disposed in the containers 50. The secondary containers 51 can be, for example, paper bags or crates.

The automated warehouse 10 is also suitably provided with an automatic control and management system, which allows human operators to indicate a placement in one of the storage and conveyor units 30, in which to load or from which to unload an article. The automatic control and management system automatically controls the drives of the storage and conveyor units 30, of the feed devices 24, of the elevating devices 25 and of the centralized movement device, and therefore also the displacements of the mobile transport devices 22. The drives and displacements of the various components of the automated warehouse 10 can be coordinated with each other.

A method for loading one or more articles in the automated warehouse 10 according to the present invention is described below.

The article to be loaded is first disposed in a container 50 which, once ready to be loaded (for example when it is full, or simply when the article has been disposed therein), is placed by a human operator on one of the feed devices 24, in correspondence with a feeding and withdrawing station 23. It should be noted that the container 50 has been assigned a predetermined placement in the warehouse.

The container 50 is displaced by the feed device 24 toward the end portion 24B thereof so as to be picked up by the corresponding elevating device 25, or directly by a mobile transport device 22, if the container 50 is to be loaded onto one of the conveying planes 320A, 321A of the conveyor 32A disposed lower than one of the storage and conveyor units 30.

If the container 50 is picked up by the elevating device 25, the latter takes the container 50 to the height of the mobile transport device 22 in correspondence with the conveyor 32B, 32C where the predetermined placement of the container 50 is. The latter is then taken by the mobile transport device 22, by means of its extendable gripping member 221, which is suitably driven by its own motor member 223.

Once the extendable gripping member 221 has been retracted, in order to take the container 50 within the limits of the mobile transport device 22, the latter is displaced in correspondence with the loading and unloading sector 200 facing the loading and unloading station 40 of the predetermined storage and conveyor unit 30. At this point, it is advantageous to provide that the corresponding conveyor 32A, 32B, 32C has been previously driven so as to dispose the predetermined placement in correspondence with the same loading and unloading station 40, so as to optimize timings.

Subsequently, after being displaced to its raised position, if necessary, the mobile transport device 22 transfers the container to its predetermined placement, completing the operation of loading the article. The mobile transport device 22 is again ready to perform another operation, whether it is loading or unloading one or more articles.

Similarly, a method for unloading one or more articles by means of the automated warehouse 10 according to the present invention is described below.

An article to be unloaded from the automated warehouse 10 is indicated to the automatic control and management system. Once the container 50 in which the article is located has been identified, it is taken, by driving the corresponding conveyor 32A, 32B, 32C, in correspondence with the loading and unloading station 40 of the storage and conveyor unit 30 in which the container 50 that contains the article to be unloaded is located.

The mobile transport device 22, which conveniently has already been displaced toward the same loading and unloading station 40, and possibly taken to its raised position, if necessary, takes the container 50 by means of its extendable gripping member 221, and loads it on board so that it can transport it.

The mobile transport device 22 is then displaced toward a predetermined feeding and withdrawing station 23, where the container is set down on the elevating device 25, if necessary, or directly on a feed device 24. The human operator can then withdraw the container 50 that contains the article to be unloaded.

The automated warehouse 10 described above allows to optimize order processing times, since it makes it possible to process multiple orders at the same time, thanks to the presence of several mobile transport devices 22 and storage and conveyor units 30 with multiple conveyors 32A, 32B, 32C, each having several conveying planes 320A, 321A, 320B, 321B, 320C, 321C.

Furthermore, having both a loading and unloading apparatus 20 with mobile devices 22 able to pick up the containers 50, and also at least one storage and conveyor unit 30 able to displace the containers 50, which operate simultaneously, it is also possible to shorten the times of each order taken individually, as explained above, since these elements can move, at least partly, simultaneously, in a reciprocally coordinated manner.

The idea behind the invention is to divide the displacements of the article to be loaded or unloaded between two automatic apparatuses in order to optimize timings, for example by driving both apparatuses and executing displacement steps of different components in parallel.

One advantage of the automated warehouse 10 described above lies in the compactness of the loading and unloading apparatus 20, which mainly comprises a structurally simple support structure 21 with small sizes. In addition to facilitating assembly, the compactness also allows to shorten the operating paths of the mobile transport devices 22, which can be managed by means of a centralized movement device. This allows to do without mobile devices equipped with individual motors, and therefore to prevent the stops required to recharge the individual motors, as well as the maintenance steps thereof.

These advantages are achieved thanks to the combination of a loading and unloading apparatus equipped with mobile transport devices, on the one hand, with one or more storage and conveyor units that displace the articles to a predetermined loading and unloading station. The displacements of the mobile transport devices are therefore limited between one or more loading and unloading sectors within the support structure, and one or two feeding and withdrawing stations at the ends of the support structure.

It should be noted that depending on requirements, it is obviously possible to design an automated warehouse with a different number of storage and conveyor units, each possibly equipped with a different number of conveyors, and also with a different number of conveying planes for each conveyor.

The sizes of the loading and unloading apparatus can be adapted to the sizes of the automated warehouse itself.

It is clear that modifications and/or additions of parts may be made to the automated warehouse as described heretofore, without departing from the field and scope of the present invention as defined by the claims.

It is also clear that, although the present invention has been described with reference to some specific examples, a person of skill in the art shall certainly be able to achieve many other equivalent forms of automated warehouse, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. An automated warehouse, comprising:
   (i) one or more storage and conveyor units able to store one or more articles inside a plurality of containers, wherein each storage and conveyor unit:

(a) provides a station for loading and unloading the articles, and
   (b) comprises a plurality of conveyors of the close-circuit type, disposed one above the other so that each conveyor is mobile independently from the others along a respective horizontal reference plane in order to displace said plurality of containers, and
   (ii) an apparatus for loading and unloading articles comprising:
   (c) at least one mobile transport device, and
   (d) a fixed support structure, in which said mobile transport device is mobile, and which provides at least one sector for loading and unloading the articles in correspondence with which said mobile transport device can release or pick up articles to/from said storage and conveyor unit, wherein said sector is disposed in the proximity of said loading and unloading station and there is provided one sector for each of said storage and conveyor units,
   wherein in the automated warehouse, said support structure comprises a plurality of transport planes parallel to each other and wherein there is provided a number of mobile transport devices equal to the number of said transport planes.

2. An automated warehouse as recited in claim 1, wherein the support structure extends along a directrix of development, along which said mobile transport device is mobile, and wherein said directrix of development develops so as to reach each loading and unloading sectors.

3. An automated warehouse as recited in claim 2, wherein said apparatus for loading and unloading articles comprises at least one feeding and withdrawing station disposed in correspondence with one end of the support structure.

4. An automated warehouse as recited in claim 2, wherein said mobile transport device can be displaced along a displacement path and comprises an extendable gripping member able to extend in a gripping direction inclined with respect to said displacement path.

5. An automated warehouse as recited in claim 2, wherein each conveyor displaces its plurality of containers on at least two conveying planes, comprising a first horizontal conveying plane and a second conveying plane disposed parallel to said first conveying plane.

6. An automated warehouse as recited in claim 2, wherein said automated warehouse comprises a centralized movement device configured to drive the displacement of said mobile transport device on a respective one of said transport planes so that it can be displaced independently of the mobile transport devices installed on the other transport planes, without interfering with the latter, along guides of said support structure, in a direction of extension in which said support structure extends.

7. An automated warehouse as in claim 2, wherein each mobile transport device comprises a slider mounted sliding on a pair of guides of said fixed structure, and a lifting member mounted directly on said slider, which comprises a pantograph mechanism and on which there is mounted an extendable gripping member.

8. An automated warehouse as recited in claim 1, wherein said mobile transport device can be displaced along a displacement path and comprises an extendable gripping member able to extend in a gripping direction inclined with respect to said displacement path.

9. An automated warehouse as recited in claim 8, wherein said mobile transport device comprises a lifting member on which there is mounted said extendable gripping member able to lift the latter so as to alternatively take said mobile transport device between a lowered position and a raised position, wherein said mobile transport device is configured to interact with containers disposed on said first conveying plane when it assumes said lowered position, and is configured to interact with containers disposed on said second conveying plane when it assumes said raised position.

10. An automated warehouse as in claim 8, wherein the mobile transport device comprises a lifting member on which the extendable gripping member is disposed.

11. An automated warehouse as recited in claim 10, wherein said mobile transport device comprises a lifting member on which there is mounted said extendable gripping member able to lift the latter so as to alternatively take said mobile transport device between a lowered position and a raised position, wherein said mobile transport device is configured to interact with containers disposed on said first conveying plane when it assumes said lowered position, and is configured to interact with containers disposed on said second conveying plane when it assumes said raised position.

12. An automated warehouse as recited in claim 1, wherein each conveyor displaces its plurality of containers on at least two conveying planes comprising a first horizontal conveying plane and a second conveying plane disposed parallel to said first conveying plane.

13. An automated warehouse as recited in claim 12, wherein said mobile transport device comprises a lifting member on which there is mounted said extendable gripping member able to lift the latter so as to alternatively take said mobile transport device between a lowered position and a raised position, wherein said mobile transport device is configured to interact with containers disposed on said first conveying plane when it assumes said lowered position, and is configured to interact with containers disposed on said second conveying plane when it assumes said raised position.

14. An automated warehouse as recited in claim 1, wherein said automated warehouse comprises a centralized movement device comprising drive belts able to drive the displacement of said mobile transport device on a respective one of said transport planes so that it can be displaced independently of the mobile transport devices installed on the other transport planes, without interfering with the latter, along guides of said support structure, in a direction of extension in which said support structure extends.

15. An automated warehouse as in claim 1, wherein each mobile transport device comprises a slider mounted sliding on a pair of guides of said fixed structure, and a lifting member mounted directly on said slider, which comprises a pantograph mechanism and on which there is mounted an extendable gripping member.

16. A method comprising loading or unloading an article from an automated warehouse, wherein said automated warehouse is as recited in claim 1.

17. The method as recited in claim 16, which further provides the steps of:

(a) displacing the mobile transport device, along a displacement path which includes the loading and unloading sector, from or toward the loading and unloading sector; and simultaneously, before or after step (a), step (b) of displacing, by means of a storage and conveyor unit, at least one article toward or from the loading and unloading station.

18. The method as recited in claim 16, wherein the article is transferred between the loading and unloading sector of the loading and unloading apparatus and the loading and unloading station of the conveyor module by the mobile transport device located in correspondence with said loading and unloading sector.

19. The method as in claim 17, wherein said step of displacing said mobile transport devices provides to independently displace the mobile transport devices disposed on the different transport planes in order to possibly be able to load/unload articles simultaneously on/from different transport planes, and possibly also on/from different storage and conveyor units.

20. The method as in claim 17, wherein said step of displacing said mobile transport devices provides to independently displace the mobile transport devices disposed on the different transport planes in order to possibly be able to load/unload articles simultaneously on different transport planes or from different transport planes, and possibly also on different storage and conveyor units or from different storage and conveyor units.

* * * * *